Patented Aug. 15, 1950

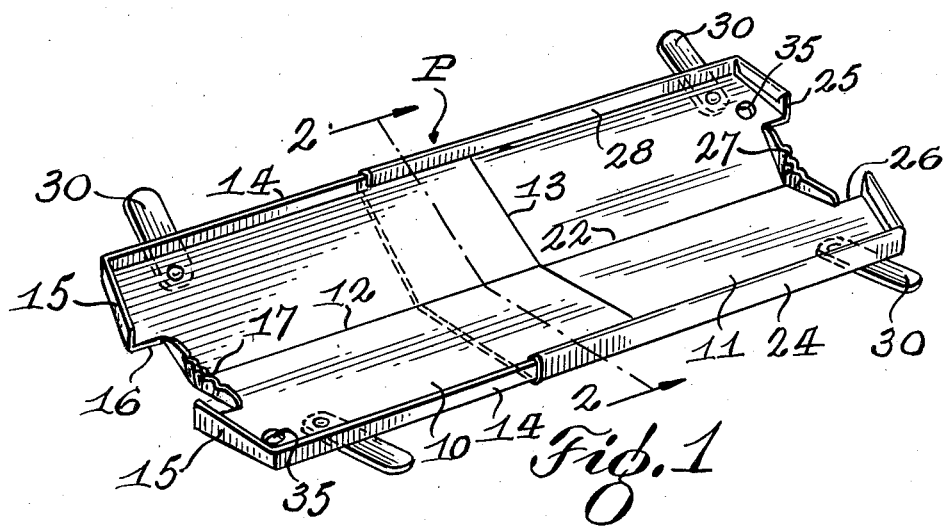
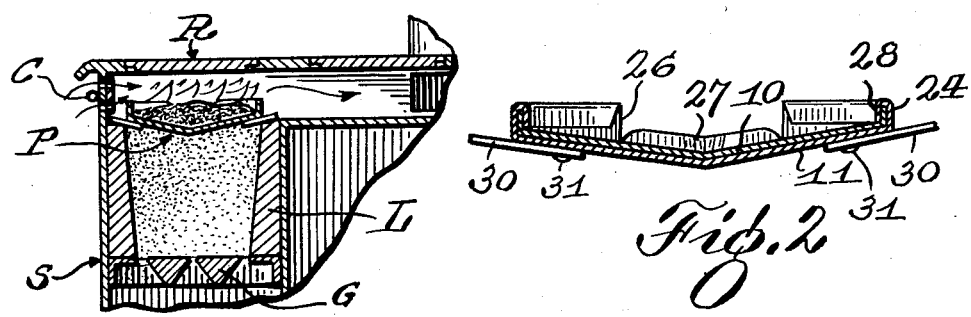
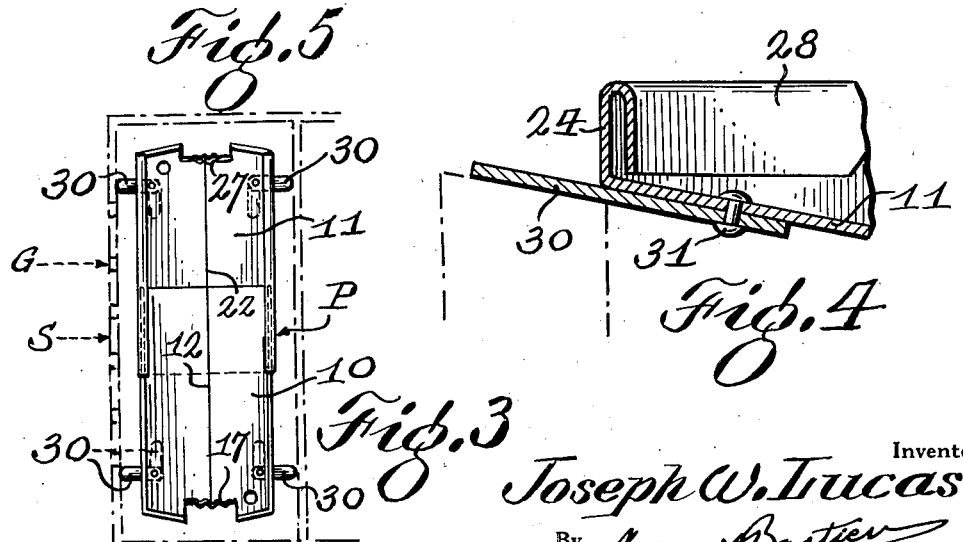

2,519,263

UNITED STATES PATENT OFFICE 2,519,263

AUXILIARY FUEL PAN FOR STOVES AND THE LIKE

Joseph W. Lucas, Westmount, Quebec, Canada

Application October 6, 1948, Serial No. 53,056
In Canada December 4, 1946

3 Claims. (Cl. 126—147)

The present invention relates to furnace and range fuel receptacle and, more particularly, such a receptacle for burning conveniently pulverulent and like comminuted fuels.

The main object of the invention, therefore, resides in the provision of means for the convenient and efficient combustion of small quantities of pulverulent fuels.

Another object of the invention is the provision of a receptacle of the character described, which is selectively adaptable to stoves, ranges and the like at an instant's notice.

A further object concerns a fuel burning receptacle which is dependable, rugged, inexpensive and has a relatively long life.

Still another object contemplates a fuel pan for stoves and the like which is effective for frying purposes at a great saving in fuel and time.

A still further object envisages a device of the type referred to which is especially useful for the instant and intense heating and cooking of food for short periods of time.

Other objects and advantages of the invention will become apparent, or be pointed out further, during the description to follow.

As an example, and for purposes of illustration only, an embodiment of the invention is shown in the annexed drawing wherein—

Figure 1 is a perspective view of the receptacle,

Figure 2 is a transverse section taken on line 2—2 of Figure 1,

Figure 3 is a plan view of the said receptacle,

Figure 4 is a partial transverse enlarged section of one corner of the receptacle taken through one supporting lug, and Figure 5 is a partial section through a typical cooking stove showing the receptacle in place at the top of the fire-box of said stove.

Referring to the drawings, wherein similar reference characters represent corresponding parts throughout, the letter "P" indicates generally the receptacle of the invention which is in the form of an elongated shallow pan, which pan is intended to be disposed inside a range or stove so as to lie across the fire-box, at the top thereof, and consequently positioned immediately underneath the lide of said stove or range.

As shown to advantage in Figure 1, the receptacle consists of two separate components 10 and 11 adapted to slide one within the other so as to contract or elongate the receptacle for fitting the same within any stove. Of course, each component of the pan resembles the other in cross section.

The section 10 is formed of a flat sheet of heat-resisting material, such as a suitable steel, bent longitudinally along a medial line 12, to form a pair of planes diverging from each other at a very obtuse angle. The inner edge 13 of said section is cut right angularly with respect to said line 12, while the outer end of the section is angularly formed as shown clearly in Figure 1. The outer edges of said section, except the edge 13, are provided with upstanding marginal flanges 14 and 15 integral respectively with the side and outer end thereof.

In the outer edge, in the middle thereof, a recess 16 is formed by cutting out a portion of the section, at the bottom of which recess an upstanding crimped web 17 is raised for maintaining the angular position between the two halves of the section.

The complementary section 11 is similar in all respects to section 10 in being bent along a medial line 22, having an end recess 26, marginal flanges 24 and 25 as well as the upstanding web 27 formed at the inner edge of the recess 26; said section differs, however, in having the flanges 24 continued inwardly to provide a lip 28 spaced from the flange 24 so as to constitute a channel within which the flange 14 of section 10 is adapted to slide, for changing at will the effective length of the pan.

For securing the pan in place, inside a stove, there are provided adjacent the corners of each pan section 10 and 11, a supporting lug 30 pivoted by means of a rivet or the like 31, said lug being adapted to be swung in projecting position beyond the flanges 14 and 24 (as shown in Figure 1), or retracted in inoperative position under the section (see Figure 3) when it is desired to ship the pan or to store it away when not in use. Naturally, in the last instance, the pan will be contracted to occupy the smallest possible space, said contraction being easily effectuated by sliding section 10 completely within section 11.

In use, the pan is preferably disposed as illustrated in Figure 5, said figure showing a stove S, the fire-box of which has the usual lower grate G and provided with the refractory lining L. The pan of the invention is mounted to rest across the top of the fire-box, or refractory lining, by extending outwardly the lug 30 and adjusting the length of the pan to suit the longer dimension of the stove fire-box. So disposed, the pan will be immediately under the lid R and, furthermore, directly adjacent the combustion air grating C which, on most stoves, is adjustable above the fire-box to control the admission of combustion air in said stove.

In the pan installed as above described, a small quantity of fuel is distributed uniformly, which fuel is confined between the flanges 14 and 24 and the webs 17 and 27. Preferably, it is contemplated to use in the pan of the invention a special granulated fuel which is highly inflammable and is, therefore, readily ignited without special preparation or precaution. Obviously, once a good fire has been started in the pan, additonal fuel of less inflammable nature can be added to sustain combustion for long periods of time and, for example, during extended cooking or frying of food. Consequently, the regulation of the fire in the pan is easily effectuated and under control at all times; for example, should it be desired to put out the fire entirely, all that is necessary is to close all draft apertures of the stove, as well as the chimney draft regulator or valve.

Should it be desired to remove the pan from the stove, when said pan is still hot, each section may be engaged by a poker or the like instrument inserted through the apertures 35 formed at opposite corners of the pan, one in each section. Thus, it would be relatively easy to contract the receptacle by pulling in either direction by means of a poker hooked as described above.

From the foregoing, it should be evident that the present invention is an advance of the art in that it enables the burning of smal quantities of fuel in a most economical and efficient manner when heat is desired for short periods of time only. Furthermore, the pan, being directly underneath the lid of the stove, is capable of heating very strongly said lid in order to furnish a violent heat suitable for certain types of frying or broiling; as is generally the case, a small steak does not require extended heating, but an intense heat for a short period of time.

It must be understood that various changes as to the shape, size and arrangement of parts can be resorted to without departing from the spirit of the invention or the scope of the subjoined claims.

Having thus described my invention, I claim:

1. A device of the character described, comprising a pair of complementary shallow pans slidable one within the other, said pans bent longitudinally at their medial portion to form relatively inclined sides, said sides inclined upwardly from the medial line, an upstanding baffle at the outer end of each pan extending at right angles across the medial portion thereof and integral with a substantial width of both inclined sides, disposed inwardly from said end and substantially parallel therewith, and retractable lugs at the corner of said pans.

2. A fuel receptacle for use in stoves and the like, comprising an extensible shallow casing formed of a pair of pans, each pan bent medially along its longitudinal axis to form relatively inclined flat sides, said sides inclined upwardly from the medial line, upright flanges on the side edges of said pans, the outer end of each pan having a square medial recess cut therein, an upstanding baffle at the inner edge of said recess, extending right-angularly across the bent medial portion and integral with both inclined sides to reinforce the same, a flange on the end edges of each pan on both sides of the recess, and retractable lugs at the corner of said pans.

3. As an article of manufacture, an imperforate fuel receptacle for use in stoves, ranges and the like, comprising a pair of complementary shallow pans slidable one within the other, each pan bent longitudinally and medially to form relatively inclined flat sides, said sides inclined upwardly from the medial line, a flange on the edges of said pans for retaining fuel therein, a portion of said pans at the medial line cut out at each end of said receptacle, an upstanding baffle at the inner edge of each cut-out portion, extending at least across said medial portion to contact both inclined sides, and retractable lugs at the corners of said pans.

JOSEPH W. LUCAS.

REFERENCES CITED

The following references are of record in the file of this patent:

UNITED STATES PATENTS

| Number | Name | Date |
| --- | --- | --- |
| 685,484 | Orcutt | Oct. 29, 1901 |
| 720,589 | Jennings | Feb. 17, 1903 |
| 790,166 | Wood-Allen | May 16, 1905 |
| 837,377 | Bennett | Dec. 4, 1906 |